(12) United States Patent
Costello et al.

(10) Patent No.: US 10,405,561 B2
(45) Date of Patent: Sep. 10, 2019

(54) CONFECTIONARY PRODUCTS AND THEIR MANUFACTURE

(71) Applicant: INTERCONTINENTAL GREAT BRANDS LLC, East Hanover, NJ (US)

(72) Inventors: Padraig Costello, Eysins (CH); Adele Hitchen, Eysins (CH); Kaya Anbarci, Eysins (CH); Celia Melina Schebella, Victoria (AU); Thomas Philip Imison, Eysins (CH)

(73) Assignee: INTERCONTINENTAL GREAT BRANDS LLC, East Hanover, NJ (US)

( * ) Notice: Subject to any disclaimer, the term of this patent is extended or adjusted under 35 U.S.C. 154(b) by 854 days.

(21) Appl. No.: 14/362,521

(22) PCT Filed: Dec. 6, 2012

(86) PCT No.: PCT/GB2012/053031
§ 371 (c)(1),
(2) Date: Jun. 3, 2014

(87) PCT Pub. No.: WO2013/083981
PCT Pub. Date: Jun. 13, 2013

(65) Prior Publication Data
US 2014/0370159 A1  Dec. 18, 2014

(30) Foreign Application Priority Data
Dec. 6, 2011  (GB) .................................. 1120966.5

(51) Int. Cl.
*A23G 3/42* (2006.01)
*A23G 3/34* (2006.01)
(Continued)

(52) U.S. Cl.
CPC ............. *A23G 3/42* (2013.01); *A23G 3/0021* (2013.01); *A23G 3/0063* (2013.01); *A23G 3/52* (2013.01);
(Continued)

(58) Field of Classification Search
None
See application file for complete search history.

(56) References Cited

U.S. PATENT DOCUMENTS

| | | | |
|---|---|---|---|
| 3,265,508 A | 8/1966 | Wurzburg | |
| 4,219,582 A | 8/1980 | Cheng | |

(Continued)

FOREIGN PATENT DOCUMENTS

| | | | |
|---|---|---|---|
| CN | 101889622 A | * 11/2010 | ........... A23G 3/0021 |
| EP | 0252306 | 1/1988 | |

(Continued)

OTHER PUBLICATIONS

Machine translation of CN 101889622. Publication date Nov. 24, 2010. pp. 1-3.*

(Continued)

*Primary Examiner* — Jenna A Watts
(74) *Attorney, Agent, or Firm* — Cantor Colburn LLP

(57) ABSTRACT

An edible jelly product, being a body formed from a mass of jelly-forming material by a progressive advancement of said mass to a forming station and progressive formation of the body at the forming station, wherein said mass comprises a sugar and a structure-forming agent selected from a hydrocolloid and modified starch, wherein the solids content of the jelly product, when formed into the body, is at least 60 wt %. A method is described of making such an edible jelly product which is transparent and contains air bubbles which are visible by eye; and which may be brought together with other such jelly products to form consolidated bodies (Continued)

such as twists, which can be easily peeled apart by consumers.

24 Claims, 3 Drawing Sheets

(51) Int. Cl.
    *A23G 3/52*     (2006.01)
    *A23G 3/54*     (2006.01)
    *A23P 30/20*     (2016.01)
    *A23L 29/219*     (2016.01)

(52) U.S. Cl.
    CPC ............. *A23G 3/54* (2013.01); *A23L 29/219* (2016.08); *A23P 30/20* (2016.08); *A23V 2002/00* (2013.01)

(56) References Cited

U.S. PATENT DOCUMENTS

| | | | |
|---|---|---|---|
| 4,567,055 A | | 1/1986 | Moore |
| 4,744,997 A | * | 5/1988 | Hoffmann ............ A23G 3/0252 426/512 |
| 4,913,924 A | | 4/1990 | Moore |
| 4,925,380 A | | 5/1990 | Meisner |
| 4,948,615 A | | 8/1990 | Zallie et al. |
| 6,773,744 B1 | | 8/2004 | Ward et al. |
| 2006/0147585 A1 | * | 7/2006 | Winckelmann ...... A23G 3/0085 426/96 |
| 2006/0198930 A1 | * | 9/2006 | Royo .................... A23G 3/007 426/94 |
| 2008/0038416 A1 | * | 2/2008 | Burgess ............... A23G 3/0068 426/143 |
| 2009/0081349 A1 | * | 3/2009 | Kamper ................. A23G 3/52 426/561 |

FOREIGN PATENT DOCUMENTS

| | | |
|---|---|---|
| EP | 0253763 A1 | 1/1988 |
| EP | 0390960 | 5/1989 |
| EP | 2364599 A1 | 9/2011 |
| GB | 583030 | 12/1946 |
| GB | 691782 | 5/1953 |
| GB | 2342030 | 4/2000 |
| JP | 2008073020 A | 4/2008 |
| JP | 2009039064 A | 2/2009 |
| RU | 2374887 C2 | 9/2008 |

OTHER PUBLICATIONS

Kainuma, Keiji; "The Latest Research on a Potato Flower and Potato Starch"; Denpun Kogyo Gakkaishi; Journal of Starch Industry; vol. 9, No. 2; Accepted: Jul. 1, 1961; English Translation; 5 Pages.
Notice of Reasons for Rejection; Japanese Patent Application No. 2014-545350; dated May 12, 2015; 6 Pages.
Notification of the First Office Action; Chinese Application No. 201280059608.0; dated May 11, 2015; 16 Pages.
IPRP PCT/GB2012/053031 dated Jun. 10, 2014.
Hoover R: "Acid-treated starches," Food Reviews International, Taylor & Francis, Philadelphia, USA, vol. 16, No. 3, Jan. 1, 2000 (Jan. 1, 2000), pp. 369-392, XP009167687, ISSN: 8755-9129 the whole document.
ISR PCT/GB2012/053031 dated Jun. 19, 2013.
Kumagai H et al: "Quality Control of Extruded Jelly Through a Predicated Enthalpy Profile," Agricultural and Biological Chemistry, Japan Soc. for Bioscience, Biotechnology and Agrochem, Tokyo, JP, vol. 54 No. 8, Aug. 1, 1990 (Aug. 1, 1990), pp. 1981-1985, XP000174609, ISSN: 0002-1369 table 1.
GB SR_GB1120966.5 dated Mar. 22, 2012.
Official Action; Russian Application No. 2014123020; dated Jun. 30, 2015; 8 Pages.

* cited by examiner

CONFECTIONARY PRODUCTS AND THEIR MANUFACTURE

FIELD

The disclosure relates to confectionery products and their manufacture. The disclosure relates in particular to novel jelly products having an attractive range of properties, and their manufacture.

BACKGROUND

Jelly products comprising modified starch, or gelatin, or a combination of modified starch and gelatin are known. Such products are manufactured by depositing a cooked liquid mass into a mould. This manufacturing process is typically highly energy intensive, due to the heating required to dry the product to the final solids content. The manufacturing process is also typically also highly labour intensive, due the handling of the individual trays containing the deposited jelly product. The shape and size of such products is limited by the shape and size of the mould, which in turn is limited by the physical size of the manufacturing equipment. The moulded products of "jelly-type" have good appearance, stretchiness and texture. However certain physical forms, particularly elongate pieces and slabs are not suitable to be manufactured by such processes.

Extruded sugar-based confectionery products are known. Commercially-available extruded confectionery products are believed to be based on native starch-containing recipes and are believed to comprise no or only low levels of modified starch and/or gelatin. An example is liquorice, which often contains wheat flour. Long and thin pieces of liquorice can be made. However the attractiveness of such products is diminished by their matt, opaque appearance and pasty, non-stretchy texture.

SUMMARY

The disclosure concerns the development of technology which enables the practicable, commercial manufacture of jelly products in attractive physical forms.

In accordance with a first aspect of the disclosure there is provided an edible jelly product, being a body formed from a mass of jelly-forming material by a progressive advancement of said mass to a forming station and progressive formation of the body at the forming station, wherein said mass comprises a sugar and a structure-forming agent selected from a hydrocolloid and modified starch, wherein the solids content of the jelly product, when formed into the body, is at least 60 wt %.

The sugar may in embodiments of the invention be a monosaccharide, disaccharide or polysaccharide sweetening agent. Suitable sugars can include, but are not limited to, sucrose (common "sugar"), dextrose, maltose, dextrin, maltodextrin, xylose, ribose, glucose, mannose, galactose, and fructose (levulose), and combinations thereof.

Sugar may be used as such in the manufacture of the edible jelly product or may be used in the form of syrups, for example starch-derived syrups including corn syrup and high fructose corn syrup.

In exemplary embodiments sugar may be present in an amount of at least 45 wt %, or at least 55 wt %, or at least 65 wt % by weight of the edible jelly product.

The upper limit of the sugar is determined by the other ingredients. In exemplary embodiments sugar may be present in an amount not greater than 85 wt %, or not greater than 80 wt %, or not greater than 75 wt %, by weight of the edible jelly product.

The amounts given for the sugar represent the total weight, when more than one sugar is present, based on dry weight of the sugar.

Likewise, throughout this specification when an amount is stated for any component it denotes unless otherwise stated the total weight of that component, when more than one species of that component is present; it denotes the weight of the component by weight of the edible jelly product; and it is based on the dry weight of the component.

The presence of a sugarless saccharide (for example sorbitol, xylitol, mannitol, galactitol, maltitol, hydrogenated isomaltulose (isomalt), lactitol and erythritol) is not excluded but if present it should be at such a level that it does not significantly reduce the benefits of the invention. In embodiments of the invention a sugarless saccharide may be present in an amount not greater than 20 wt %, typically not greater than 15 wt %, and typically not greater than 10 wt %, by weight of the edible jelly product. In other embodiments of the invention no sugarless saccharide is present.

The edible jelly product may contain a high-intensity sweetener. The high-intensity sweetener may be selected from the group consisting of aspartame, acesulfame K, neohespridine, saccharin, thaumatin, and mixtures thereof. When present, a high-intensity sweetener may be present in an amount of from 0.01 wt % to 1 wt %, suitably from 0.02 wt % to 0.6 wt %. In other embodiments no high-intensity sweetener is present.

In exemplary embodiments the structure-forming agent may be present in an amount of at least 2 wt %, or at least 6 wt %, or at least 10 wt %, by weight of the edible jelly product.

In exemplary embodiments the structure-forming agent may be present in an amount not greater than 35 wt %, or not greater than 30 wt %, or not greater than 24 wt %, or not greater than 20 wt %, or not greater than 16 wt %, by weight of the edible jelly product.

The structure-forming agent may suitably be a hydrocolloid. Hydrocolloid materials can include naturally occurring materials such as plant exudates, seed gums, and seaweed extracts or they can be chemically modified materials such as cellulose, starch, or natural gum derivatives. Furthermore, hydrocolloid materials can include pectin, gum arabic, acacia gum, alginates, agar, carageenans, guar gum, xanthan gum, locust bean gum, gelatin, gellan gum, galactomannans, tragacanth gum, karaya gum, curdlan, konjac, chitosan, xyloglucan, beta glucan, furcellaran, gum ghatti, tamarin, and bacterial gums, modified natural gums such as propylene glycol alginate, carboxymethyl locust bean gum, low methoxyl pectin, and combinations thereof. Modified celluloses can be included such as microcrystalline cellulose, carboxymethylcellulose (CMC), methylcellulose (MC), hydroxy-propylmethylcellulose (HPCM), hydroxypropylcellulose (HPC), and combinations thereof. In exemplary embodiments gelatin has been found to be an effective hydrocolloid structure-forming agent.

In exemplary embodiments in which a hydrocolloid is present as structure-forming agent it may be present in an amount of at least 2 wt %, or at least 3 wt %, or at least 4 wt %, by weight of the edible jelly product.

In exemplary embodiments in which a hydrocolloid is present as structure-forming agent it may be present in an amount not greater than 15 wt %, or not greater than 10 wt %, or not greater than 8 wt %, or not greater than 6 wt %, by weight of the edible jelly product.

In exemplary embodiments the structure-forming agent may a modified starch selected from a chemically modified starch (including enzymatically modified starch) and a physically modified starch.

Chemically modified starch useful in exemplary embodiments discussed herein may be prepared by enzymatically or chemically treating native starch. Commercial supplies are readily available under the European Food Safety Authority E-numbers stated below.

The term chemically modified is intended to mean any chemical modification known in the art of starch, including without limitation starch treated with acetic anhydride (AA), propylene oxide (PO), succinic anhydride (SA), octenyl succinic anhydride (OSA), crosslinking reagents such as sodium trimetaphosphate (STMP), phosphorus oxychloride ($POCl_3$), epichlorohydrin, adipic acetic anhydride, phosphorylating reagents such as sodium tripolyphosphate (STPP) or ortho phosphates, oxidizing reagents such as sodium hypochlorite or peroxide or other food approved starch modifying reagents, enzymes or physical processes such as heat/acid (dextrinization), or thermal or hydrothermal (heat and moisture).

Chemically modified starch includes acid-treated starch (E1401), also called thin boiling starch, which is prepared by treating starch or starch granules with inorganic acids, for example hydrochloric acid, to break down the starch molecule and thus reduce the viscosity.

Other modified starches and treatments to produce them are:

- dextrin (E1400) roasted starch with hydrochloric acid or ortho-phosphoric acid
- alkaline-modified starch (E1402) by treatment with sodium hydroxide or potassium hydroxide
- bleached starch (E1403) by treatment with hydrogen peroxide
- oxidized starch (E1404) by treatment with sodium hypochlorite, breaking down viscosity
- enzyme-treated starch. Enzymatic modification includes treatment by exo- and/or endo-enzymes, including without limitation alpha-amylase, beta-amylase, glucoamylase, maltogenase, pullulanase and isoamylase or any combination of the above. Examples are (INS: 1405), maltodextrin, cyclodextrin
- monostarch phosphate (E1410) by treatment with phosphorous acid or the salts sodium phosphate, potassium phosphate, or sodium triphosphate to reduce retrogradation
- distarch phosphate (E1412) by esterification with for example sodium trimetaphosphate, crosslinked starch modifying the rheology and the texture
- acetylated starch (E1420) by treatment esterification with acetic anhydride
- hydroxypropylated starch (E1440) or starch ether, by treatment with propylene oxide, increasing viscosity stability
- hydroxyethyl starch by treatment with ethylene oxide
- octenyl succinic anhydride (OSA) starch (E1450) used as emulsifier adding hydrophobicity
- cationic starch by adding positive electrical charge to starch
- carboxymethylated starch by treatment with monochloroacetic acid adding negative charge
- and also combined modifications such as phosphated distarch phosphate (E1413), hydroxypropyl distarch phosphate (E1442), acetylated oxidized starch (E1451).

Physically modified starch is a starch derivative obtained by treatment of starch without the use of chemicals. Typical physical modifications include pre-gelatinization, particle size adjustment, and moisture adjustment. Starches can be physically modified by (for example) roll drying, extrusion, spray drying, and with heat and moisture treatment.

The base starch which is modified for use in an exemplary embodiment(s) herein may comprise starch containing materials derived from cereals, tubers, roots, legumes, fruits and seeds; more specifically they may be starch containing materials derived from corn (maize), pea, potato, sweet potato, banana, barley, wheat, rice, oat, sago, amaranth, tapioca (cassava), arrowroot, canna, triticale, and sorghum; including low and high amylose varieties of any of the foregoing. As used herein, "low amylose" is intended to include a starch containing no more than about 10%, particularly no more than about 5%, most particularly no more than about 2%, by weight amylose. The term "high amylose" is intended to include a starch containing at least about 40%, particularly at least about 70%, most particularly at least about 80%, by weight amylose.

In exemplary embodiments modified starches which require cooking may be employed. Such starches are distinct from cold water soluble, pregelatinized or instant starch (physically modified starch) which thickens and gels without heat.

In some embodiments the structure-forming agent is acid-treated starch. This is also called thin boiling starch and is prepared by treating the starch with an inorganic acid to partially break down the starch and reduce its viscosity. As noted above, a suitable example of an acid-treated starch is the product available from suppliers as approved product E1401.

In exemplary embodiments in which a modified starch is present as structure-forming agent it may be present in an amount of at least 6 wt %, or at least 8 wt %, or at least 10 wt % by the edible jelly product.

In exemplary embodiments in which a modified starch is present as structure-forming agent it may be present in an amount not greater than 35 wt %, or not greater than 30 wt %, or not greater than 24 wt %, or not greater than 20 wt %, or not greater than 16 wt %, by weight of the edible jelly product.

The edible jelly product will typically contain a small amount of water in the material to be cooked. Typically the gelatin or another hydrocolloid is provided as a solution in water, and there may be a further small addition of water. This may be added as such (neat water) and/or as a component of a flavoring, for example a fruit juice. The amount of water from all sources in the ingredients to be cooked is at least sufficient to permit dissolution of the ingredients under the cooking conditions which are selected. In numerical terms, the amount of water present from all sources is typically at least 4 wt %, preferably at least 8 wt %. Typically it is not greater than 20 wt %, and more preferably not greater than 15 wt %. These amounts refer to entrained water in the edible jelly product.

Gelatin is present in some exemplary embodiments. In others gelatin is not present.

Further ingredients may be added as required.

Possible further ingredients include coloring agents. Coloring agents may include pigments and natural food colors and dyes suitable for food, drug, and cosmetic applications. Suitable food colors include annatto extract (E160b), bixin, norbixin, astaxanthin, dehydrated beets (beet powder), beetroot red/betanin (E162), ultramarine blue, canthaxanthin (E161g), cryptoxanthin (E161c), rubixanthin (E161d), violanxanthin (E161e), rhodoxanthin (E161f), caramel (E150 (a-d)), beta-apo-8-carotenal (E160e), carotene (E160a), alpha carotene, gamma carotene, ethyl ester of beta-apo-8-carotenal (E160f), flavoxanthin (E161a), lutein (E161b), cochineal extract (E120), carmine (E132), carmoisine/azorubine (E122), sodium copper chlorophyllin (E141), chlorophyll (E140), toasted partially defatted cooked cottonseed flour, ferrous gluconate, ferrous lactate, grape color extract, grape skin extract (enocianina), anthocyanins (E163), haematococcus algae meal, synthetic iron oxide, iron oxides and hydroxides (E172), fruit juice, vegetable juice, dried algae meal, tagetes (Aztec marigold) meal and extract, carrot oil, corn endosperm oil, paprika, paprika oleoresin, phaffia yeast, riboflavin (E101), saffron, titanium dioxide, turmeric (E100), turmeric oleoresin, amaranth (E123), capsanthin/capsorbin (E160c), lycopene (E160d), FD&C blue #1, FD&C blue #2, FD&C green #3, FD&C red #3, FD&C red #40, FD&C yellow #5 and FD&C yellow #6, tartrazine (E102), quinoline yellow (E104), sunset yellow (E110), ponceau (E124), erythrosine (E127), patent blue V (E131), titanium dioxide (E171), aluminum (E173), silver (E174), gold (E175), pigment rubine/lithol rubine BK (E180), calcium carbonate (E170), carbon black (E153), black PN/brilliant black BN (E151), green S/acid brilliant green BS (E142), and combinations thereof. In some embodiments, certified colors can include FD&C aluminum lakes, and combinations thereof.

Possible further ingredients include flavoring agents. It will be appreciated that some of the coloring agents are flavoring agents too, for example fruit juices.

Of particular interest are natural colors and/or flavors which may be achieved by adding fruit juices in normal or concentrated form (e.g. cranberry juice, raspberry juice, apple juice). Alternatively synthetic concentrated colorants or flavorants may be used.

Possible further ingredients include antioxidants.
Possible further ingredients include nutraceuticals.
Possible further ingredients include oral care agents.
Possible further ingredients include lubricants.

In exemplary embodiments the amounts of further ingredients (going beyond the structure forming agent(s), sugar and water, and which may include colorants, flavorants, antioxidants, nutraceuticals, oral care agents and lubricants, may be up 10 wt % by weight of edible jelly product, or up to 5 wt %, or up to 2 wt %.

The solids content of the edible jelly product may be at least 65 wt %, or at least 70 wt %, and most preferably at least 75 wt %.

The solids content of the edible jelly product may be not greater than 90 wt %, or not greater than 85 wt %.

It was mentioned in the introduction that some candy products of a progressively formed or extruded nature have been made in which a native starch was used. Herein and in contrast, use of a structure-forming agent selected from a hydrocolloid or a modified starch. This disclosure suitably does not employ an unmodified or native starch, such as a wheat starch, as the structure-forming agent; it would not give the product properties which are desired. Preferred jelly products as discussed herein contain no unmodified starch. However the presence of a small amount of unmodified starch is not excluded, provided that the hydrocolloid and/or modified starch structure-forming agent is present in a sufficient amount to beneficially influence or determine the properties of the edible jelly product. Suitably, therefore, an unmodified starch, when present, is present in a lesser amount by weight compared with the combined weight of the hydrocolloid and the modified starch, when both are present, or the weight of the hydrocolloid alone, or the modified starch alone, when only one of them is present.

An unmodified starch, when present, may therefore be present in an amount not exceeding 20 wt % by weight of the ingredients to be cooked, preferably not exceeding 10 wt %, preferably not exceeding 5 wt %. As already noted, however, in exemplary embodiments there may be no unmodified starch present.

Suitable methods for forming an edible jelly product in accordance with the first aspect of this disclosure will now be described.

One method of providing progressive advancement of said mass to a forming station is a sheet-forming method in which material is conveyed to a nip between a roller and a plate, or between two rollers, at which nip the sheet forms, and from which the sheet advances.

One method of providing progressive advancement of said mass to a forming station and progressive formation of the edible jelly product is an extrusion method.

Excellent results have been achieved using a mixing extruder in which twin intermeshing screws are employed within an extruder barrel in which they are a close fit. In some exemplary embodiments the screws rotate in the same direction, i.e. co-rotate. Preferably the average spacing between the flights (raised portions) of the screws and the walls of the extruder barrel does not exceed 2 mm. In some embodiments it does not exceed 1 mm. In some embodiments it does not exceed 0.5 mm. The clearance between the screws may be such that the average clearance between the flight of one screw and the flight of the other screw is not more than 2 mm, or not more than 1.2 mm, or not more than 0.8 mm. In these definitions it is the tips or extremities of the flights that are referenced.

The shear rate in the channel of a twin screw extruder is given by the following equation $$\gamma = \frac{\pi x D x N}{60 x h}$$

where
$\gamma$=Shear rate in screw channel
D=Screw diameter in mm
N=Screw speed in revolutions/minute
h=Channel depth in mm, and shear rate is given in sec$^{-1}$ In exemplary embodiments, employing a twin screw extruder the shear rate calculated as described above, between the flights of the screws and the barrel wall, is at least 120 s$^{-1}$, or at least 200 s$^{-1}$. In some embodiments it is at least 300 s$^{-1}$, or at least 400 s$^{-}$.

The shear rate between the tips of the screws of a twin extruder is suitably in excess of 120 s$^{-1}$, or in excess of 200 s$^{-1}$, or in excess of 300 s$^{-1}$, or in excess of 400 s$^{-1}$.

The shear rate between the tips of the screws of a twin extruder is believed to be in excess of the shear rate between the flights of the screws and the barrel wall, in embodiments disclosed herein.

As will be well known to the skilled person, extruders can be supplied with one of more functional elements selected from: conveying elements which predominantly provide advancement of the material to be extruded; and kneading elements and mixing elements, each of which works the material, in different ways. When a twin-screw extruder is used in some embodiments its screws may have solely or predominantly conveying elements. Surprisingly good results have been achieved, in our experiments, using a twin-screw extruder whose screws have only conveying elements; especially when there is severe restriction on space within the extruder, such that the process can be regarded as predominantly one of advancement, but under high pressure and shear.

We have also achieved good results using a piston extruder without a screw or screws.

The use of other extrusion equipment such as former extruders and cooking extruders, or twin-screw extruders with counter-rotating screws, is not excluded herein, but is thought to be less apt from for the methods we describe.

In embodiments of manufacture of the edible jelly product, there is no external heating supply during the advancement of the mass and/or formation of the edible jelly product at the forming station. In some embodiments cooling may be carried out as the mass is advanced. The extruder barrel may be cooled.

The cooking which is required to form the edible jelly product may be done prior to the advancement of the mass and formation of the jelly product. In some embodiments the cooking may be preferably done before the jelly mass is fed to the extruder. In certain embodiments the solids content of the jelly mass which is fed to the extruder may be at least 65 wt %, or at least 70 wt %, or at least 75 wt %. In certain embodiments the solids content of the jelly mass which is fed to the extruder may be not greater than 90 wt %.

The solids content value of the edible jelly product which is formed at the forming station may be within 10%, or within 5%, of the solids content value of the mass which is fed to the extruder; that is, if the solids content of the edible jelly product which is formed at the forming station is 80% the solids content of the mass which is fed to the extruder is suitably between 70% and 90%.

Preferably the method of forming the edible jelly product does not require, or employ, any post-treatment to change the water content of the edible jelly product. For example stoving is not required, or employed. The edible jelly product can simply be passively or actively cooled (see later); given any surface treatment which is required (see later); put together with other products if desired to form a consolidated product (see later); and packaged. The solids content of the edible jelly product which is packaged may in some embodiments be within 10%, or within 5%, of the solids content of the mass which entered the extruder.

In embodiments the edible jelly product emerges from the extruder at a lower temperature than the temperature at which the mass entered the extruder. The temperature may be at least 20° C. lower, or at least 30° C. lower. It may emerge from the forming station of the extruder at a temperature below 110° C., or in some embodiments below 100° C.; for example, in some embodiments, in the range 25-70° C., or 30-65° C. Typically it emerges as a softly gelled mass which retains some propensity to flow, until it is cooled, and then becomes firmer; rather than being a firm gel immediately following extrusion.

In embodiments the extruded product is actively cooled. Forced air cooling could be used. Cooled air could be used. In some embodiments a cooling tunnel using cooled and forced air is used. Alternatively or additionally the product may be extruded onto a cooled tray or belt. Because it is typically a flowable material a slight "flat" may be seen on careful inspection of the edible jelly product, in some embodiments. However this is acceptable, particularly given that some exemplary embodiments may be soft-eating jellies, not hard chewy or brittle candy-type products.

The edible jelly product may be given a surface treatment in order to improve its handling or separation properties. For example it may be dusted with a powder, typically with icing sugar or starch powder; or it may be given a drying or non-drying liquid coating, for example a hydrocolloid solution or vegetable oil or wax. Exemplary hydrocolloid materials include pectin, gum arabic, acacia gum, alginates, agar, carageenans, guar gum, xanthan gum, locust bean gum, gelatin, gellan gum, galactomannans, tragacanth gum, karaya gum, curdlan, konjac, chitosan, xyloglucan, beta glucan, furcellaran, gum ghatti, tamarin, and bacterial gums. Particularly suitable as a composition for surface treatment include a gum solution (typically a gum arabic solution), a pectin solution, or an edible vegetable oil or edible vegetable wax.

The liquid coating may also be a mixture of a hydrocolloid solution and sugar. The sugar may be a monosaccharide, disaccharide or polysaccharide sweetening agent. Suitable sugars can include, but are not limited to, sucrose (common "sugar"), dextrose, maltose, dextrin, maltodextrin, xylose, ribose, glucose, mannose, galactose, and fructose (levulose), and combinations thereof. Particularly suitable coating mixtures include a mixture of gum arabic, water and sugar, where the gum arabic is present in an amount of about 20% to about 80%, water is present in an amount of about 20% to about 80%, and sugar is present in an amount of about 2% to about 30%, by weight.

The liquid coating may also optionally be heated or cooled prior to application in order to aid spraying (or another selected mode of application) and/or spreading on the product surface.

The surface treatment may be applied by any available method. Methods which give a high degree of control over the thickness and the evenness of the surface treatment (such as vibratory powder feeding or electrostatic coating) are preferred.

In some embodiments two jelly masses of contrasting color and/or flavor may be co-extruded so as to produce, for example, a product of extruded side-by-side type, or skin-core type. In some embodiments a single jelly mass may be extruded.

In some embodiments disclosed herein an edible jelly product is monolithic.

In some embodiments the edible jelly product may be in the form of a strand or rope. In some embodiments the cross-sectional area does not exceed 180 mm$^2$, and in some embodiments may not exceed 120 mm$^2$. In some embodiments it may not exceed 80 mm$^2$. In some embodiments it may not exceed 40 mm$^2$. In some embodiments it may not exceed 15 mm$^2$. In some embodiments it may not exceed 3 mm$^2$.

In another embodiment the edible jelly product may be a strip or elongate slab. Preferably the average thickness of the strip does not exceed 10 mm, and in embodiments may not exceed 6 mm. In some embodiments the thickness of the strip may not exceed 4 mm.

The edible jelly products formed as described may be cut into pieces. In the case of ropes these may suitably be of length in the range 5-20 cm, or may suitably be of length 8-16 cm. In the case of strips or slabs these may typically be of length in the range 2-10 cm and width in the range 2-10 cm.

In exemplary embodiments two or more edible jelly products of the first aspect may be brought together downstream of the forming station to form a consolidated multi-product body. When a plurality of products (for example ropes or strands, or slabs or strips) are thus consolidated individual products may be separable from the body by peeling them apart by hand. The consolidated multi-product extruded body may be cut into shorter lengths. This may be before or after twisting (when carried out).

For example ropes or strands may be laid together as a bunch or bundle. They may be twisted together, to improve their aesthetics and inhibit premature separation prior to sale of the product, for example during packaging, storage, or transportation. A bundle of ropes or strands may itself be twisted to form a more complex twisted array. In the case of strips or slabs they may be laid on each other to form a stack.

In the case of a twisted array of strands or ropes, this may be achieved after full cooling, downstream of the extruder, or may be carried out, in certain embodiments, on extrusion (for example using a rotating die head) or soon thereafter.

We have found that particularly good separation of jelly products, including strips, slabs, strands and ropes, is achieved when the products are brought together at a moderately warm temperature. Below about 15° C. the jelly products were generally found to be too rigid and non-tacky for optimal bringing-together. Above 40° C. and they were generally found to be too fluid or viscous for optimal bringing-together. Thus the bringing together of the jelly products is carried out at above 15° C. in some good embodiments, or at above 20° C. The bringing together of the jelly products is suitably carried out below 40° C. in some good embodiments, or below 35° C.

A rope or strand of the jelly product may be a twisted rope or twisted strand. A twisted rope or strand may be produced by using a rotating die head at the extruder outlet. It may be a single twisted rope or strand. As noted above a bundle of strands or ropes may itself be twisted to form a more complex twisted array.

In some embodiments all of the ingredients of the edible jelly product are cooked together and added to the extruder. However in some embodiments certain ingredients, in particular flavor(s) and/or color(s) and/or acid(s) may be added to the advancing mass immediately prior to the formation of the product. In the case of an extruder this may be by use of one or more jacketed or un-jacketed static mixers, in combination with one or more injection ports located upstream of the static mixer(s). Thus mixing of the flavor(s) and/or color(s) and/or acid(s) may be performed either in the extruder barrel or in static mixers downstream of the extruder or in pipework therebetween. The use of a pipework arrangement where the flow of product from the extruder is split and directed into multiple static mixers downstream of the extruder permits addition of different ingredients (color(s) and/or flavor(s) and/or colors (or different amounts of the same ingredients) into different portions of jelly product, thus leading to differentiated extruded products.

In exemplary embodiments no air is intentionally added to the mass during the method of forming the edible jelly product; for example as by air injection. However air is likely to be unavoidably entrained in the mass. This was expected to be a problem: in an extruder which involves a high degree of shear it was expected that even without deliberate aeration, the entrained air would be spread into the mass as small bubbles which would introduce undesired clouding or hazing. To our surprise, however, we found that the entrained air appeared, in the edible jelly products produced, predominantly or substantially all as discrete bubbles of moderate size (for example of 5 µm-5 mm, or 0.2 mm-3 mm, 0.5-2 mm or 1 mm-2 mm mean diameter). In the products we have produced in doing this work such bubbles appear as discrete "islands", visible in a transparent matrix of the edible jelly products. It appears that smaller bubbles which we expected to cause clouding or hazing have not appeared; we believe (without being bound by theory) that the entrained air may have stayed as, or coalesced into, such larger bubbles. The resulting product, clear but with discrete bubbles, easily visible to the naked eye, is of an attractive appearance. These findings were contrary to our expectation.

In exemplary embodiments the bubbles are predominantly or substantially all of volume in the range from $65 \times 10^{-9}$ mm$^3$ to 65 mm$^3$, or from $65 \times 10^{-6}$ mm$^3$ to 40 mm$^3$, or from $4 \times 10^{-3}$ mm$^3$ to 15 mm$^3$, or from 0.05 mm$^3$ to 10 mm$^3$, or from 0.5 mm$^3$ to 5 mm$^3$.

In exemplary embodiments the density of the edible jelly product is at least 1.2 gcm$^{-3}$, or at least 1.3 gcm$^{-3}$, or at least 1.4 gcm$^{-3}$, or at least 1.45 gcm$^{-3}$. In exemplary embodiments the density of the edible jelly product is up to 1.8 gcm$^{-3}$, or at least 1.7 gcm$^{-3}$, or at least 1.6 gcm$^{-3}$, or at least 1.55 gcm$^{-3}$. These density values denotes overall density, including any bubbles that may be present.

As is known to the skilled person bubble size may be assessed by X-ray tomography or by scanning electron microscopy.

The dimensions and/or volume of bubbles present in an edible jelly product may be derived by using an X-ray micro-computed tomography system to image and visualise the internal cellular structure of the product, and by using a T-View software package (from Skyscan, Belgium, 2003 release); both as described by K. S. Lim and M. Barigou in Food Research International, volume 37, issue 10, 2004, pages 1001-1012. This article may be regarded as a reference source in relation to the definitions of bubble size given in this specification.

In some embodiments the air content in the edible jelly product does not exceed 10% of the total product volume. In some embodiments the air content in the edible jelly product does not exceed 5% of the total product volume. This can be assessed by X-ray tomography as described above or by scanning electron microscopy or by density measurement techniques.

The properties of the edible jelly product of the first aspect of this disclosure will now be described. The properties are achievable by methods which have been described above, although this description of preferred methods is not limiting, and the properties may be separately achievable.

In exemplary embodiments the edible jelly product is fully consumable (e.g. it does not in some way incorporate a chewing gum or other element which is intended to be discarded). In exemplary embodiments the edible jelly product essentially consists of only the extruded edible jelly as the material to be eaten. That is, preferably, it contains no inclusions of other edible material.

In exemplary embodiments the edible jelly product is transparent (whether coloured or colourless; and including translucent). In exemplary embodiments having bubbles, as mentioned above, the edible jelly product may be sufficiently transparent that the bubbles are visible by eye.

When a cylindrical rope of 8 mm diameter is made in accordance and is colourless, it is suitably sufficiently transparent that objects can be seen through it by eye. This may be regarded as a simple but effective test for transparency.

In exemplary embodiments the edible jelly product has no color, or has a color which does not render it non-transparent.

In exemplary embodiments the edible jelly product is stretchable at ambient temperature (such as 20° C.). For example, when a 6 mm diameter circularly cylindrical extruded rope of edible jelly product is pulled apart under a tensile force, at 20° C., steadily and gently from each end, it may extend by at least 10%, or by at least 30%, or at least 50%, before it breaks. In exemplary embodiments, at 20° C., the product may have an elastic deformation stage and a plastic deformation stage, before failure occurs. These stages can overlap. It may be described as a visco-elastic material at 20° C.

Exemplary Embodiments subject to the aforementioned tensile force may form a thinned neck before failure occurs (in contrast a strand of liquorice of diameter 8 mm which will typically fail after very little stretch; and failure will be a non-progressive rupture).

In exemplary embodiments the surface of the edible jelly product is glossy, although, as stated above, it may be given a surface treatment.

In accordance with a second aspect of this disclosure there is provided a method of making an edible jelly product of the first aspect, the method being as described above. In exemplary embodiments the method employs a co-rotating twin-screw extruder with low clearances between the screws, and between each screw and the barrel (as previously described and defined).

In accordance with a third aspect of this disclosure there is provided a consolidated product, comprising a plurality of edible jelly products of the first aspect, in surface-to-surface contact, such that a single edible jelly product can be removed by peeling it from the other product(s).

In accordance with a fourth aspect of this disclosure there is provided an extruded edible jelly product, wherein the product comprises a transparent matrix containing a plurality of visible bubbles of air, wherein the air content of the product does not exceed 20% of the total product volume, or in embodiments, does not exceed 10% of the total product volume.

In exemplary embodiments the bubbles may be of size as defined above.

Desirable aspects of the above-defined first aspect are also desirable aspects of the second, third and fourth aspects. Desirable aspects of the above-defined second aspect are also desirable aspects of the first, third and fourth aspects. Desirable aspects of the above-defined third aspect are also desirable aspects of the first, second and fourth aspects. Desirable aspects of the above-defined fourth aspect are also desirable aspects of the first, second and third aspects.

BRIEF DESCRIPTION OF THE FIGURES

The disclosure will now be further described, by way of example, with reference to the accompanying figures and the following examples; each are provided by way of illustration only.

DETAILED DESCRIPTION

Example 1

Equipment

Figure 1:
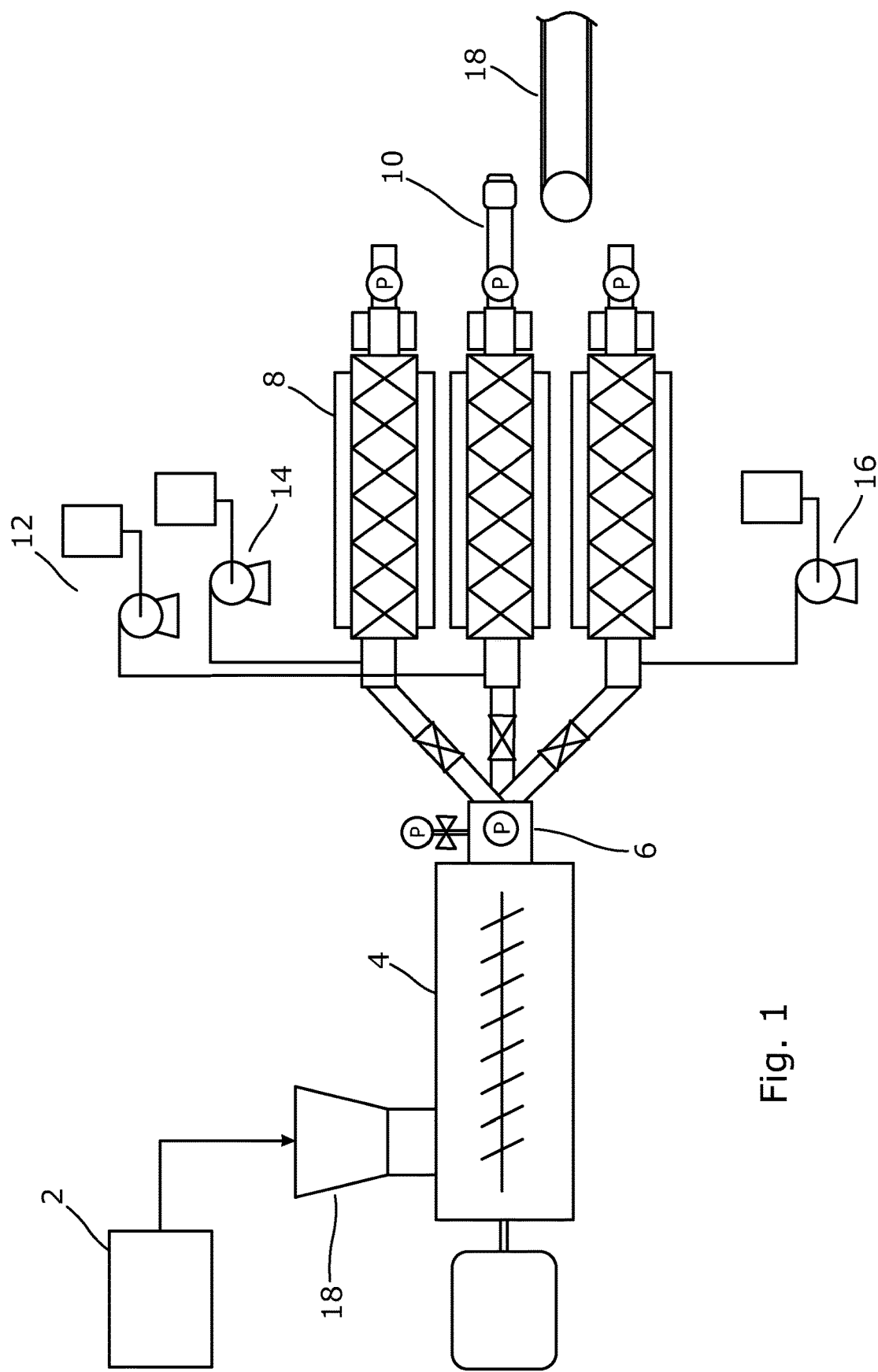
FIG. 1 is a schematic drawing of manufacturing apparatus for making products.

Pilot plant scale indirect (tubular) cooker skid, supplied by Vomatech BV:
  30 kg steam jacketed pre-mix vessel with high shear mixer
  Steam tubular cooker with back pressure capability
  Steam jacketed flash off vessel with vacuum pump
  Twin-screw co-rotating extruder supplied by Gabler GmbH
  Jacketed static mixers (SMX type) supplied by Sulzer Chemtech
Marble slab/cooling table
Piston extruder supplied by A.W.Smith & Sons Ltd
The following components were used:

| Ingredient | kg | wt % recipe | Ingredient solids (wt %) | Recipe solids (wt %) |
|---|---|---|---|---|
| Water | 2 | 6.7 | 0 | 0.0 |
| Gelatin solution (ex-Rousselot) | 2.5 | 8.3 | 38 | 3.2 |
| Glucose syrup (ex-Roquette) | 12.6 | 42.0 | 80 | 33.6 |
| Acid modified starch (ex-Roquette) | 3.5 | 11.7 | 86 | 10.0 |
| Sugar (ex-British Sugar) | 9.2 | 30.7 | 100 | 30.7 |
| Apple juice (ex-Firmnenich) | 0.2 | 0.7 | 73 | 0.5 |
| Total | 30 | 100 | | 78.0 |

Method:

Water and glucose were added into a pre-mix vessel. Agitation and heat were applied to blend the ingredients and warm to around 60° C. The acid-modified starch and sugar were combined into a dry blend and added gradually into the water and glucose mix. Agitation and heat were continued. Pre-mix temperature did not exceed 85° C. to avoid starting starch gelatinization. Finally gelatin solution and apple juice concentrate were added to the pre-mix. At this point the pre-mix solids were 78%.

The pre-mix solution was then entered into the cooking system. The product was cooked under a back pressure of c. 0.5 MPa and to a temperature of 135° C. After reaching the desired cooking temperature the product flow was directed into the steam jacketed flash off vessel under c. 40 kPa vacuum to remove excess moisture. The product can then be extracted from the flash off vessel. The extraction temperature was approximately 80° C. and product solids content before color/flavor/acid (CFA) addition was about 82%.

CFA was optionally added manually after cooking. Following cooking and optional CFA addition, the jelly mass was extruded. This extrusion step can comprise either cooling followed by extrusion, or cooling during and/or following extrusion. Both options are described below.

1a) Example of Cooling Followed by Extrusion

The cooked jelly product was cooled on a marble slab or cooling table from about 80° C. to about 40° C. During this cooling phase the product was continually moved and folded to ensure cooling was homogeneous throughout the product. At about 40° C. the product was placed into the piston extruder. The machine comprises a piston which moves in a vertical motion to express product through a die head with a circular cross-section, and with a diameter of approximately 6 mm. The machine and die head were fully glazed with oil before becoming in contact with the product. The extrusion temperature of the jelly was about 35° C. to form a jelly rope.

The extruded ropes of product were laid onto a plastic tray (which was not cooled), and which comprised multiple grooves along the length of the tray. The product ropes were extruded into the grooves in order to prevent spreading of the ropes as the product cooled and set.

The trays were then left at ambient temperature overnight until the product ropes had fully set and could be removed from the trays.

The product of the above Example 1a) was substantially clear, although multiple large (1 mm or greater diameter; 0.5 mm³ or greater volume) air bubbles were clearly visible in the product ropes. The surface of the ropes was smooth and glossy.

1 b) Example of Cooling During and after Extrusion

With reference to FIG. 1, the cooked jelly mass at a temperature of approximately 85° C. was transferred from cooker 2 to a twin-screw co-rotating mixing extruder 4 supplied by Gabler GmbH, model no. DE-40-T-15D. The extruder was fitted with a jacketed feeding hopper and the jacket temperature was maintained at 85° C. by means of hot water circulation through the jacket. The extruder screw configuration used only conveying type screw elements.

The extruder was connected to a 'flow splitter' device 6 and jacketed static mixers 8 supplied by Sulzer Chemtech. The jacketed static mixers were of the 'SMX' type design and had an internal diameter of about 40 mm and length about 1 m. The jacketed static mixers were further connected to extrusion nozzles 10 with a circular cross-section of internal diameter about 4 mm.

Pressure is monitored at the end of the mixing extruder and at the end of each static mixed by pressure gauges marked P in FIG. 1.

The extruder 4 was heated to about 60° C. and the jacketed static mixers 8 were heated to a temperature of about 60° C. by means of hot water circulation through their respective heating jackets. At the inlet to each static mixer 8 one or more additives (for example color(s) or flavor(s) and/or acid(s) may be injected via a respective inlet port, fed by a respective metering pump arrangement 12, 14, 16.

Once the above temperatures had been reached, jelly at a temperature of about 90° C. was introduced into the feed hopper 18 of the extruder 4 and the extruder screws were rotated at a range of speeds from 50 rpm to 90 rpm (as stated in the table below). Additives were added to the respective portions of jelly downstream of the flow splitter device to render each final jelly rope distinctive, in comparison with the others.

After about 2 minutes, jelly was observed to exit the extrusion nozzles 10. The process was left for about 10 minutes to stabilize, and then the extruded jelly ropes were laid onto a moving stainless steel cooling band 20 in order to further cool the product. The steel surface of the cooling band was oiled before introducing the product in order to prevent adhesion of the product to the metal. The jelly was sticky to the touch at the point at which it exited the extrusion nozzles.

The temperature of the jelly at the point at which it exited the nozzles was about 50° C. The temperature of the water used in the cooling band 20 was about 15° C. The temperature of the jelly ropes at the end of the cooling band was about 25° C., at which point the jelly was observed to be substantially less sticky when compared to the point of exit of the extrusion nozzles. The ropes could be manually handled and twisted together by hand at this point in order to form twisted rope shapes. The flow rate was about 6.5 kg/h per nozzle, i.e. about 13 kg/h total.

The cooling band 20 has a width of about 1.2 m and a length of about 6 m. The linear speed of the cooling band was about 5 m/min. Some die-swell was observed in the ropes at the point of exit of the extrusion nozzles. The final diameter of the cooled ropes at the end of the cooling band was about 5 mm. Little or no spreading of the jelly on the cooling band was observed, i.e. the jelly ropes maintained a substantially cylindrical cross-section, with an almost imperceptible "flat" on their external surface.

For this example colors, flavors and acid were added to the jelly prior to extrusion. Colors, flavors and acid, or combinations of these, can optionally be added to the jelly at the point of entry of the jelly into the jacketed static mixers, or using optional injection ports in the extruder barrel, in order to extrude multiple ropes with one or more colors and/or flavors, and/or acids.

In the table below the shear rate is the shear rate between the tips of the flights of the extruder screws and the barrel wall, calculated by the equation given above (the screw diameter D being 39.4 mm and the channel depth being 0.3 mm, in the equipment used).

Examples 2-19

These examples used the jelly mass described in Example 1. Examples 2-12 used the same extrusion apparatus as is described in Example 1: an extruder with a flow splitter and jacketed static mixers. Two ropes were extruded directly onto a cooling belt with a length of about 5 m and with a surface temperature of about 17 to 25° C. Examples 13-19 used a somewhat different extrusion arrangement: the same extruder, with the same conveying elements set-up, but without the flow splitter or the jacketed static mixers. One rope was extruded directly from the extruder onto a cooling belt with a length of about 5 m and a surface temperature of about 17 to 25° C. The extrusion parameters were adjusted, as stated in the table below. In particular, it is noted that the examples produced products when the jelly temperature at the die plates varied widely, from the lowest value of 26° C. (Example 9), up to 69° C. (Example 2).

| Ex. | Temp. of jelly in feed hopper (° C.) approx | Extruder screw speed (rpm) | Extruder torque (Nm) | Calculated Shear rate ($s^{-1}$) | Set-point temp. of extruder cooling jacket (° C.) | Set-point temp. of jacketed static mixer (° C.) | Jelly temp. at die plate (° C.) | Jelly temp. at end of cooling band (° C.) | Approx. jelly flow rate (kg/h) | Comments on product appearance |
|---|---|---|---|---|---|---|---|---|---|---|
| 2 | 85° C. | 50 | 17 | 344 | 60 | 70 | 69 | 28 | 20 | Product flowing on belt, resulting in non-cylindrical cross-section. |

| Ex. | Temp. of jelly in feed hopper (° C.) approx | Extruder screw speed (rpm) | Extruder torque (Nm) | Calculated Shear rate (s⁻¹) | Set-point temp. of extruder cooling jacket (° C.) | Set-point temp. of jacketed static mixer (° C.) | Jelly temp. at die plate (° C.) | Jelly temp. at end of cooling band (° C.) | Approx. jelly flow rate (kg/h) | Comments on product appearance |
|---|---|---|---|---|---|---|---|---|---|---|
| 3 | 90° C. | 50 | 23 | 344 | 60 | 60 | 54 | 24 | 13.5 | Temperature too high/ viscosity too low for rope formation Clear ropes with a few visible bubbles and substantially cylindrical cross section. Smooth and shiny rope surface, slightly sticky to touch. |
| 4 | 90° C. | 50 | 23 | 344 | 55 | 55 | 50 | 25 | 13 | Clear ropes with a few visible bubbles and substantially cylindrical cross section. Smooth and shiny rope surface, slightly sticky to touch. |
| 5 | 85° C. | 30 | — | 206 | 55 | 55 | 49 | — | 9 | Clear ropes with a few visible bubbles and substantially cylindrical cross section. Smooth and shiny rope surface, slightly sticky to touch. |
| 6 | 85° C. | 50 | 24 | 344 | 55 | 55 | 49 | 24 | 13.5 | Clear ropes with a few visible bubbles and substantially cylindrical cross section. Smooth and shiny rope surface, slightly sticky to touch. |
| 7 | 85° C. | 55 | 23 | 378 | 55 | 55 | 48 | — | 14.5 | Clear ropes with a few visible bubbles and substantially cylindrical cross section. Smooth and shiny rope surface, slightly sticky to touch. |
| 8 | 85° C. | 50 | 21 | 344 | 55 | 50 | 60 | 24 | 15 | Clear ropes with a few visible bubbles and substantially cylindrical cross section. Smooth and shiny rope surface, slightly sticky to touch. |
| 9 | 85° C. | 40 | 21 | 275 | 50 | 40 | 26 | 19 | 2 | Ropes produced but flow rate low. |
| 10 | 85° C. | 70 | 28 | 481 | 50 | 40 | 28 | — | 5.5 | Clear ropes with a few visible bubbles and substantially cylindrical cross section. Smooth and shiny rope surface, slightly sticky to touch. |
| 11 | 85° C. | 30 | 19 | 206 | 50 | 50 | 52 | 21 | 8.5 | Clear ropes with a few visible bubbles and substantially cylindrical cross section. Smooth and shiny rope surface, slightly sticky to touch. |
| 12 | Approx. 85° C. | 30 | 27 | 206 | 45 | 40 | 45 | 21 | 10 | Clear ropes with a few visible bubbles and substantially cylindrical cross section. Smooth and shiny rope surface, slightly sticky to touch. |
| 13 | Approx. 85° C. | 30 | 20 | 206 | 70 | 70 | 54 | 30 | 11 | Clear ropes with a few visible bubbles and substantially cylindrical cross section. Smooth and shiny rope surface, slightly sticky to touch. |
| 14 | Approx. 85° C. | 30 | 27 | 206 | 50 | 50 | 53 | 30 | 14.5 | Clear ropes with a few visible bubbles and substantially cylindrical cross section. Smooth and shiny rope surface, slightly sticky to touch. |

-continued

| Ex. | Temp. of jelly in feed hopper (° C.) approx | Extruder screw speed (rpm) | Extruder torque (Nm) | Calculated Shear rate ($s^{-1}$) | Set-point temp. of extruder cooling jacket (° C.) | Set-point temp. of jacketed static mixer (° C.) | Jelly temp. at die plate (° C.) | Jelly temp. at end of cooling band (° C.) | Approx. jelly flow rate (kg/h) | Comments on product appearance |
|---|---|---|---|---|---|---|---|---|---|---|
| 15 | Approx. 85° C. | 50 | 35 | 344 | 50 | 50 | 50 | 31 | 15 | Clear ropes with a few visible bubbles and substantially cylindrical cross section. Smooth and shiny rope surface, slightly sticky to touch. |
| 16 | Approx. 85° C. | 70 | 36 | 481 | 50 | 50 | 54 | 35 | 16 | Clear ropes with a few visible bubbles and substantially cylindrical cross section. Smooth and shiny rope surface, slightly sticky to touch. |
| 17 | Approx. 85° C. | 90 | 36 | 619 | 50 | 50 | 53 | 32 | 18 | Clear ropes with a few visible bubbles and substantially cylindrical cross section. Smooth and shiny rope surface, slightly sticky to touch. |
| 18 | Approx. 85° C. | 90 | 40 | 619 | 35 | 35 | 48 | 23 | 8 | Clear ropes with a few visible bubbles and substantially cylindrical cross section. Smooth and shiny rope surface, slightly sticky to touch. |
| 19 | Approx. 85° C. | 50 | — | 344 | 35 | 35 | 41 | 19 | 3.5 | Clear ropes with a few visible bubbles and substantially cylindrical cross section. Smooth and shiny rope surface, slightly sticky to touch. |

It will be seen from the table above that these examples were successful. In all cases product was formed. At very high or very low extrusion temperatures (jelly temperatures) the conclusion may be that, although ropes can be formed at these temperatures, it would probably not be commercially practicable: for Example 2, where the jelly temperature at the die plate was 69° C., the jelly was probably rather fluid; at 26° C. (Example 9) the flow rate was low and it may be expected that the energy to achieve extrusion would be too high. However in general the examples produced excellent, clear, smooth, cylindrical ropes, with a few visible bubbles, and no indication of small bubbles which would induce light scattering, sufficient to degrade clarity.

Figure 2:
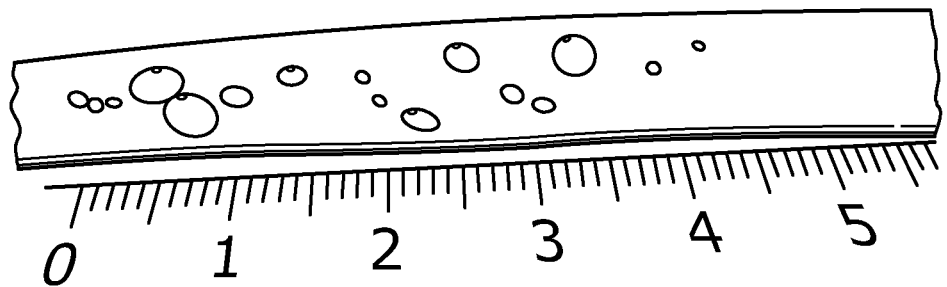
FIG. 2 is a drawing made from a photograph of a portion of a rope of edible jelly product, shown against a millimeter ruler.

FIG. 2 is a photograph of a portion of a rope of edible jelly product formed by the method of Example 1b). The rope is of a red jelly product and is of clean glossy appearance, being transparent with a few bubbles being visible to the eye. The large scale of the bubbles can be seen from the millimeter rule placed alongside the rope.

Figure 3:
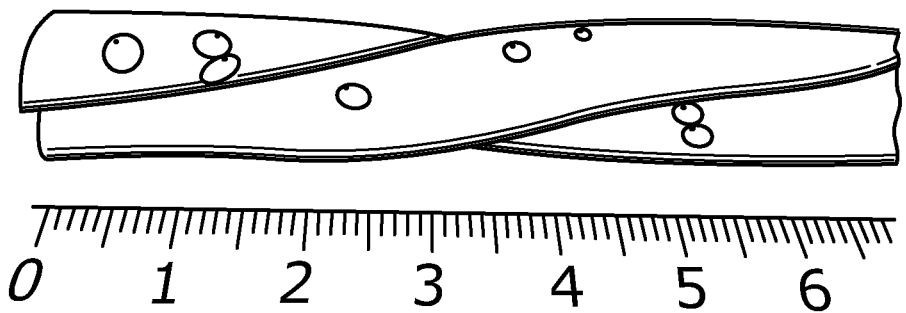
FIG. 3 is a drawing made from a photograph of a portion of two ropes of edible jelly products, formed by extrusion and wound together shortly after extrusion, shown against a millimeter ruler.

FIG. 3 is a photograph of a portion of two ropes of edible jelly products twisted together formed by the method of Example 1 b), and wound shortly together after extrusion. The ropes are of contrasting yellow and orange color. Each is of clean glossy appearance, each being transparent with a few bubbles being visible to the eye. The scale of the bubbles can be seen from the millimeter rule placed alongside the ropes.

Figure 4:
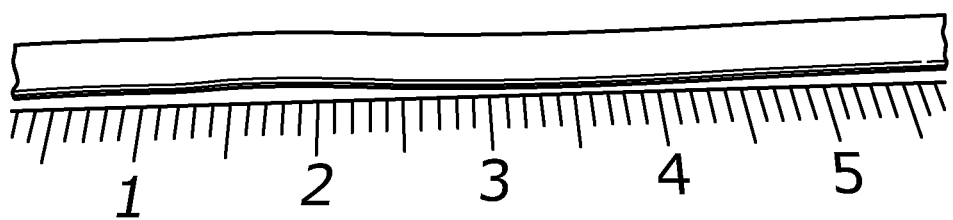
FIG. 4 is a drawing made from a photograph of a portion of a rope of edible jelly product, shown against a millimeter ruler.

FIG. 4 is a photograph of a rope of edible jelly product formed by the method of Example 13. The rope is of a yellow jelly product and is of clean glossy appearance, with smaller bubbles than those in FIGS. 1 and 2, assessed by eye as mostly being in the range of 0.01-0.1 mm in mean diameter ($5 \times 10^{-7}$ mm$^3$-$5 \times 10^{-4}$ mm$^3$ in volume). However the rope is transparent: the grid on which the rope is resting can be seen through the rope.

Examples 20-23

All wt % unless otherwise stated

Example 20

The following components were used:

| Ingredient | kg | % recipe | Ingredient solids | Recipe solids | % recipe solids |
|---|---|---|---|---|---|
| Water | 2.8 | 9.3 | 0 | 0 | 0 |
| Invert syrup | 9.24 | 30.8 | 76 | 23.4 | 23.4 |
| Glucose syrup | 4.02 | 13.4 | 80 | 10.7 | 10.7 |
| Acid-thinned (modified) maize starch | 3.46 | 11.5 | 86 | 9.9 | 9.9 |
| Sugar | 10.48 | 34.9 | 100 | 34.9 | 34.9 |
| TOTAL | 30 | 100 | | | 79 |

This recipe contained modified starch, but did not contain gelatin. Invert sugar was added to soften the product texture.

The same equipment was used as in Example 1a. The method used was also the same as Example 1 and 1a, except that the cooking temperature was about 132-135° C. Also, the solids content of the pre-mix in Example 20 was about 80%, and the cooked solids content (prior to colour, flavour and acid addition) was about 82%.

The product was extruded using the method described in Example 1a, i.e. using a piston extruder supplied by A.W.Smith & Sons Ltd.

Clear extruded ropes of jelly were produced. The properties of the jelly were similar to the jelly of Example 1a, except that the texture was perceived to be softer, and less elastic during consumption. The clarity was similar to the product of Example 1a, i.e. substantially clear.

Example 21

The following components were used:

| Ingredient | kg | % recipe | Ingredient solids | Recipe solids |
|---|---|---|---|---|
| Water | 3 | 10.1% | 0 | 0.0 |
| 240 bloom gelatin solution | 0.5 | 1.7% | 38 | 0.6 |
| Glucose syrup | 12.6 | 42.3% | 80 | 33.8 |
| Acid-thinned (modified) maize starch | 4.3 | 14.4% | 86 | 12.4 |
| Sugar | 9.2 | 30.9% | 100 | 30.9 |
| Apple juice | 0.2 | 0.7% | 73 | 0.5 |
| Total | 29.8 | 100% | | 78.2 |

This recipe had a higher modified starch:gelatin ratio than the recipe of Example 1. This permitted a slightly higher extrusion temperature of 40° C. (compared to about 35° C. in Example 1). This was due to the higher setting temperature of the recipe of Example 21 compared to the recipe of Example 1.

The same equipment was used as in Example 1. The method used was also the same as Example 1 and 1a, except that the cooking temperature was about 133-135° C., and the vacuum flash-off vessel was not used. Also, the solids content of the pre-mix in Example 21 was about 78%, and the cooked solids content (prior to colour, flavour and acid addition) was about 81%.

The product was extruded using the method described in Example 1a, i.e. using a piston extruder supplied by A.W.Smith & Sons Ltd. The temperature of the product during extrusion was about 40° C.

Clear extruded ropes of jelly were produced. The properties of the jelly were similar to the jelly of Example 1a, except that the product was perceived to be significantly more sticky in the mouth of the consumer than the product of Example 1a. The product of Example 21 was also observed to be significantly less elastic than the product of Example 1a. The clarity of the product of Example 21 was about the same as the clarity of the product of Example 1a.

Example 22

The following components were used:

| Ingredient | kg | % recipe | Ingredient solids | Recipe solids |
|---|---|---|---|---|
| Water | 2.75 | 9.2% | 0 | 0.0 |
| 240 bloom gelatin solution | 1 | 3.3% | 38 | 1.3 |
| Glucose syrup | 12.6 | 42.0% | 80 | 33.6 |
| Acid-thinned (modified) maize starch | 4.25 | 14.2% | 86 | 12.2 |
| Sugar | 9.2 | 30.7% | 100 | 30.7 |
| Apple juice | 0.2 | 0.7% | 73 | 0.5 |
| Total | 30 | 100% | | 78.2 |

This recipe also had a higher modified starch:gelatin ratio than the recipe of Example 1.

The same equipment was used as in Example 1. The method used was also the same as Example 1 and 1a, except that the cooking temperature was about 135° C. Also, the solids content of the pre-mix in Example 22 was about 77.5%, and the cooked solids content (prior to colour, flavour and acid addition) was about 82%.

The product was extruded using the method described in Example 1a, i.e. using a piston extruder supplied by A.W.Smith & Sons Ltd.

Clear extruded ropes of jelly were produced. The properties of the jelly were similar to the jelly of Example 21.

Example 23

The following components were used:

| Ingredient | kg | % recipe | Ingredient solids | Recipe solids |
|---|---|---|---|---|
| Water | 2.8 | 9.3% | 0 | 0.0 |
| 240 bloom gelatin Solution | 2.5 | 8.3% | 38 | 3.2 |
| Glucose syrup | 8.7 | 29.0% | 80 | 23.2 |
| Acid-thinned (modified) maize starch | 3.5 | 11.7% | 86 | 10.0 |
| Sugar | 12.3 | 41.0% | 100 | 41.0 |
| Apple juice | 0.2 | 0.7% | 73 | 0.5 |
| Total | 30 | 100% | | 77.9 |

This recipe has a higher sugar:glucose ratio than the recipe of Example 1.

The same equipment was used as in Example 1. The method used was also the same as Example 1 and 1a, except that the cooking temperature was about 133-135° C., and the vacuum flash-off vessel was not used. Also, the solids content of the pre-mix in Example 22 was about 78%, and the cooked solids content (prior to colour, flavour and acid addition) was about 81%.

The product was extruded using the method described in Example 1a, i.e. using a piston extruder supplied by A.W.Smith & Sons Ltd.

Clear extruded ropes of jelly were produced. The properties of the jelly were similar to the jelly of Example 1a, except that the texture of the product was perceived to be harder during consumption, and the product itself was less sticky to touch.

Examples 24-26

The following components were used:

| Ingredient | kg | % Recipe | Ingredient Solids | Recipe Solids |
|---|---|---|---|---|
| Water | 2.68 | 6.7 | 0 | 0 |
| Gelatin Solution | 3.32 | 8.3 | 38 | 3.2 |
| Glucose Syrup | 16.8 | 42.0 | 80 | 33.6 |
| Acid-thinned (modified) maize starch | 4.68 | 11.7 | 86 | 10 |
| Sugar | 12.28 | 30.7 | 100 | 30.7 |
| Apple Juice | 0.28 | 0.7 | 73 | 0.5 |
| Total | 40 | 100 | — | 78 |

The same equipment was used as in Example 1. The method used was also the same as Example 1 b, except that the cooking temperature was about 132-139° C., and the vacuum flash-off vessel was not used. The solids content of the pre-mix prior to cooking was about 78.5%, and the cooked solids content (prior to colour, flavour and acid addition) was about 82-82.5%. The pre-cooked mixture was prepared at a temperature of about 75-80° C.

A gelatin solution consisting of water and granular gelatin was prepared. The ratio of water to gelatin was 62:38 by weight.

The cooked product was extruded using the method and equipment described in Example 1b, i.e. using a twin-screw co-rotating extruder supplied by Gabler GmbH. The extruder screw element arrangement was the same as in Example 1b, i.e. only conveying elements were used.

Jelly ropes with an approximately circular cross-section and a diameter of about 3-5 mm, and jelly strips (about 30 mm width×about 3 mm high) were continuously extruded directly onto the conveyor-belt of a cooling tunnel by using an extruder die plate with either a circular or a rectangular orifice. The extrusion parameters were adjusted, as stated in the table below.

| Parameters: | Example 24 | Example 25 | Example 26 |
|---|---|---|---|
| Extruder die plate: | Circular cross-section - 4 mm diameter | Circular cross-section - 4 mm diameter | Rectangular cross-section slit - 29 × 3 mm |
| Extruder feed hopper temperature (° C.) | 81-86 | 82-86 | 82-87 |
| Extruder jacket temperature [° C.] | 45 | 40 | 40 |
| Static mixer jacket temperature [° C.] | 45 | 40 | 40 |
| Extruder speed [rpm] | 25 | 38.7 | 24.6 |
| Extruder torque [Nm] | 28.2 | 42 | 32.2 |
| Pressure at end of extruder barrels [kPa] | 2.06 | 3.44 | 3.22 |
| Pressure at die plate [kPa] | 1.07 | 1.78 | 0.30 |
| Pressure difference across the length of the jacketed static mixer [kPa] | 0.99 | 1.66 | 2.92 |
| Product temperature at end of extruder [° C.] | 35 | 35 | 34 |
| Product temperature at end of static mixer [° C.] | 31 | 31 | 31 |
| Product throughput at die plate [g/min] | 67.6 | 133 | — |
| Product throughput at die plate [kg/h] | 4.1 | 8.0 | — |

Clear extruded ropes of jelly were produced. The properties of the jelly and appearance were similar to the jelly of Example 1a.

The extruded jelly ropes were extruded onto an endless Teflon-coated belt which conveyed the ropes through a single-pass cooling tunnel with a length of about 9.6 m and with a cooling-air temperature of about 10-17° C. inside. The residence time of the jelly inside the tunnel was between approximately 240 and 300 seconds. Sticking of the jelly mass onto the belt was significantly reduced by coating the belt with Capol oil prior to contact with the extruded product.

It was also found that it was possible to cut the extruded jelly ropes/strips right at the exit of the cooling tunnel by using a plastic cutter in a guillotine action, resulting in a sharp cut, with a minimal amount of product sticking to the blade (which had a slight coating of Capol oil).

After the aforementioned cooling step, lengths of extruded jelly ropes were directed through the chamber of an electrostatic spraying system supplied by Spice Application Systems Ltd., where they were sprayed with a mist of Gum Arabic solution (supplied by cni—Colloides Naturels International). This gum arabic solution had been negatively charged by the equipment in order to create an even covering of solution on the product surface. After exiting the electrostatic spraying system, the coated ropes were brought into contact by hand in different configurations, including a parallel 'side-by-side' configuration and a 'twisted' configuration, where 2 or more ropes were wrapped around each other. The ropes were then left for a period of between about 4 and about 24 hours, after which time it was found that a bond had formed between the ropes. The ropes could then be separated by pulling them apart by hand if desired.

The texture of the product of Examples 24-26 was observed to be slightly harder during consumption and less sticky to touch than the product of Example 1a.

Example 27

Figure 5:
FIG. 5 is a perspective view of three ropes of edible jelly products, formed by extrusion and twisted together shortly after extrusion.
Figure 6:
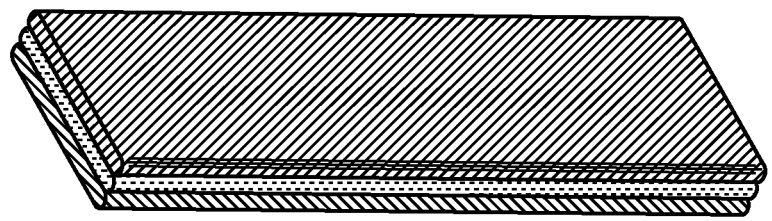
FIG. 6 is a perspective view of three slabs of edible jelly products, formed by extrusion and laid together shortly after extrusion.

A solution of gum arabic (45%); water (45%) and sugar (45%) was prepared using boiling water and was allowed to cool to about 50° C. Multiple ropes of extruded jelly formed by extrusion with reference to Example 1 were individually coated with this gum arabic solution by hand at a temperature of about 20° C. using a brush, sufficient to form a surface coating on the ropes. The individual ropes were cut to a length of between about 5 and about 15 cm and were then brought into contact with each other in different configurations. The different configurations used were either a simple 'side-by-side' arrangement, or a twisted arrangement, with each configuration comprising either 2 or 3 individually extruded ropes as shown in FIG. 3 or FIG. 5. Once brought together into the desired configuration, the coated ropes held their form without the need to maintain an external force.

The coated ropes in their different configurations were then left at ambient temperature (about 20° C.) for several hours. After this time, the individual ropes could be easily separated from each other by hand, using a peeling motion.

The procedure of Example 27 was then repeated using an apple pectin extract solution at a concentration of about 15%, and a solution of regular pectin at a concentration of about 5%.

The ropes coated with pectin solution were found to have a more fragile bond between them when compared to the ropes coated with the gum arabic and sugar solution.

The invention claimed is:

1. A transparent edible jelly product, being a body formed from a mass of jelly-forming material by a progressive advancement of said mass to a forming station and progressive formation of the body at the forming station, wherein said mass comprises a transparent matrix of a sugar and a chemically modified starch prepared by enzymatically or chemically treating native starch, wherein a solids content of the jelly product, when formed into the body, is at least 60 wt %, wherein the edible jelly product contains discrete air bubbles that are visible by eye in the transparent matrix, wherein the discrete air bubbles have a size in the range 5 µm-5 mm, and wherein the mass is absent of intentionally added air.

2. The edible jelly product as claimed in claim 1 wherein the edible jelly product is a monolithic body consisting essentially of extruded edible jelly.

3. The edible jelly product as claimed in claim 1 wherein the edible jelly product is in the form of a strand or rope or strip or slab.

4. The edible jelly product as claimed in claim 1 wherein the body is formed by extrusion.

5. The edible jelly product as claimed in claim 1, wherein the product has a surface which allows it to be peeled from another edible jelly product against which it has been placed.

6. The edible jelly product as claimed in claim 5, that has been given a surface treatment with a material which aids separation of edible jelly products.

7. The edible jelly product as claimed in claim 6, wherein the product has been electrostatically coated.

8. The edible jelly product as claimed in claim 1, which comprises a twisted strand or rope.

9. The edible jelly product as claimed in claim 1, wherein the edible jelly product does not contain gelatin.

10. A method of making an edible jelly product as claimed in claim 1, in which method a mass of jelly-forming material is introduced into equipment which progressively advances the mass to a forming station at which progressive formation of the edible jelly product takes place; wherein the solids content value of the edible jelly product emerges from the forming station is within 10% of the solid contents value of the mass which was introduced into the equipment.

11. The method as claimed in claim 10 wherein the temperature of the edible jelly product which emerges from the forming station is at least 20° C. lower than the temperature at which the mass entered the equipment.

12. The method as claimed in claim 10 wherein the equipment comprises a co-rotating twin-mixer extruder with low clearances between the screws, and between each screw and the barrel; wherein the average spacing between the flights (raised portions) of the screws and the walls of the extruder does not exceed 2 mm; and wherein the clearance between the screws may be such that the average clearance between the flight of one screw and the flight of another screw is not more than 2 mm.

13. The method as claimed in claim 10, wherein the equipment is cooled and/or the product is cooled at the forming station or downstream of the cooling station.

14. The method as claimed in claim 10 wherein no external heating is applied to the mass as it advances, within the equipment, to the forming station.

15. The method as claimed in claim 14 wherein external cooling is applied to the mass as it advances, within the equipment, to the forming station.

16. The method as claimed in any of claim 10 wherein the method does not employ any post-formation treatment to substantially change the water content of the edible jelly product.

17. The method as claimed in any of claim 10 wherein no air is intentionally added to the mass during the method of forming the edible jelly product.

18. The method as claimed in any of claim 10 wherein two or more jelly masses are advanced to the forming station and are progressively formed at the forming station into an edible jelly product having two or more zones.

19. The method as claimed in any if claim 10 wherein the equipment comprises an extruder in which the entire mass of jelly-forming material is advanced; means for splitting the mass into two or more portions at the downstream end of the extruder, and for delivering the respective portions to respective sub-extruders or static mixers in which the portions are conveyed to respective forming stations.

20. The method as claimed in claim 19 comprising means, downstream of the means for splitting, to permit introduction into the respective portion of one or more components to achieve differentiation of the respective edible jelly products.

21. The method as claimed in any of claim 10 wherein a plurality of jelly masses are advanced to the forming station and are separately formed into a plurality of edible jelly products which are brought together downstream of the forming station to form a consolidated body having edible jelly products in surface-to-surface contact.

22. The method as claimed in claim 21 wherein the plurality of jelly masses are bought together when at a temperature of above 15° C. and below 40° C.

23. A consolidated product, comprising a plurality of edible jelly products as claimed in claim 1, in surface-to-surface contact, such that a single edible jelly product can be removed by peeling it from the other product(s).

24. The edible jelly product as claimed in claim 1, wherein the air content of the product does not exceed 20% of the total product volume, or does not exceed 10% of total product volume.

* * * * *